US009948543B2

(12) United States Patent
Chen et al.

(10) Patent No.: US 9,948,543 B2
(45) Date of Patent: Apr. 17, 2018

(54) MECHANISM TO EXTEND THE REMOTE GET TO DO ASYNC RECTANGLE BROADCAST ON A RECTANGLE WITH WILD CARDS IN THE PACKET HEADER

(71) Applicant: International Business Machines Corporation, Armonk, NY (US)

(72) Inventors: Dong Chen, Scarsdale, NY (US); Philip Heidelberger, Cortlandt Manor, NY (US); Sameer Kumar, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 14/985,027

(22) Filed: Dec. 30, 2015

(65) Prior Publication Data

US 2017/0195212 A1 Jul. 6, 2017

(51) Int. Cl.
*H04L 12/761* (2013.01)
*G06F 3/06* (2006.01)
*H04L 29/06* (2006.01)

(52) U.S. Cl.
CPC .............. *H04L 45/16* (2013.01); *G06F 3/061* (2013.01); *G06F 3/067* (2013.01); *G06F 3/0655* (2013.01); *H04L 69/22* (2013.01)

(58) Field of Classification Search
CPC ........ H04W 24/10; H04L 45/16; H04L 69/22; G06F 3/061; G06F 3/0655; G06F 3/067
USPC .......................................... 370/390; 709/245
See application file for complete search history.

(56) References Cited

U.S. PATENT DOCUMENTS

| 8,001,266 | B1 * | 8/2011 | Gonzalez | G06F 9/544 370/351 |
| 2004/0114531 | A1 * | 6/2004 | Tucker | H04L 41/0604 370/252 |
| 2005/0074001 | A1 | 4/2005 | Mattes et al. | |
| 2005/0138322 | A1 | 6/2005 | Guerrero | |

(Continued)

OTHER PUBLICATIONS

Bruck, et al., "Wildcard Dimensions, Coding Theory and Fault-Tolerant Meshes and Hypercubes", Computers, IEEE Transactions on vol. 44, Issue: 1, Publication Year: 1995, pp. 150-155.

*Primary Examiner* — Jae Y Lee
*Assistant Examiner* — Jean F Voltaire
(74) *Attorney, Agent, or Firm* — Daniel P. Morris; McGinn IP Law Group, PLLC

(57) ABSTRACT

A method (and structure) for improving efficiency in a multiprocessor system including a plurality of processor nodes interconnected in a multidimensional array, each processor node including a processor, an associated memory device, and an associated inter-nodal interface device for exchange of data with other nodes. Each processor can implement a broadcast procedure as an initiator node, using a format that permits inter-nodal interface devices at each node receiving a broadcast instruction packet to process the received broadcast instruction packet without using processing resources of the processor at the receiving node. Each inter-nodal interface device in each node can implement the broadcast procedure without using processing resources of the processor associated with the receiving node.

20 Claims, 6 Drawing Sheets

(56) References Cited

U.S. PATENT DOCUMENTS

| | | |
|---|---|---|
| 2009/0003344 A1* | 1/2009 | Kumar ................ H04L 12/1854 370/392 |
| 2009/0006546 A1 | 1/2009 | Blumrich et al. |
| 2009/0007141 A1* | 1/2009 | Blocksome ............. G06F 9/546 719/315 |
| 2009/0080431 A1 | 3/2009 | Rekhter |
| 2009/0240838 A1 | 9/2009 | Berg et al. |
| 2009/0245249 A1 | 10/2009 | Suzuki et al. |
| 2009/0259713 A1 | 10/2009 | Blumrich et al. |
| 2010/0081444 A1 | 4/2010 | Jin et al. |
| 2012/0323833 A1* | 12/2012 | Markram ............. G06N 3/0454 706/27 |

* cited by examiner

MECHANISM TO EXTEND THE REMOTE GET TO DO ASYNC RECTANGLE BROADCAST ON A RECTANGLE WITH WILD CARDS IN THE PACKET HEADER

FIELD OF THE INVENTION

The present invention relates to efficient distribution of instruction packets in multidimensional multiprocessor computer systems. Specifically, wild card characters selectively added to a packet communicate to a messaging unit of an intermediate node receiving the instruction to autonomously, without using resources of the processor at that receiving intermediate node, initiate a broadcast in a dimension different from the dimension upon which the instruction was received.

BACKGROUND

The Blue Gene is a series of supercomputers that can reach operating speeds in the PFLOPS (PetaFLOPS) range, with low power consumption. To date, there have been three Blue Gene generations: Blue Gene/L, Blue Gene/P, and Blue Gene/Q. The Blue Gene (BG) systems have several times led rankings of the most powerful and power efficient supercomputers, and the project was awarded the 2009 U.S. National Medal of Technology and Innovation.

FIG. 1 shows an exemplary configuration of the hierarchy 100 of BG processing units, beginning with individual compute chips 102, each having two processors and 4 MB memory, and progressing to an exemplary system 104 of 64 cabinets 104 encompassing 65,536 nodes with 131,072 CPUs. The BG/Q can potentially scale to 100 PFLOPS, and the Sequoia machine at Lawrence Livermore is a BG/Q with a 20 PFLOPS capability and over 1.6 million cores. However, the exact number of units or architecture is merely representative and is not particularly significant to understand the present invention, and the present invention can be implemented on configurations other than Blue Gene configurations.

The Blue Gene/P and Blue Gene/Q machines have a torus interconnect for application message passing, with the Blue Gene/P (BG/P) using a three-dimensional torus network, while the Blue Gene/Q (BG/Q) uses a five-dimensional torus network. Thus, in a BG/P machine, a core node location could be identified, such as <A,B,C>; in a BG/Q machine, a core node location could be identified in a five-axis coordinate notation such as <A,B,C,D,E>. It should be noted that such coordinate axes notation can be considered an ordered arrangement, so that one of skill in the art would be able to understand how the description "next higher dimension" or "adjacent dimension" or "dimension with a predetermined association with a dimension used to transmit a packet" or "predetermined dimension" or "dimension different from the dimension upon which the instruction was received" would have meaning.

Moreover, in multiprocessors with a torus configuration, there are interconnections between dimensions but there is also a wraparound effect in each dimension. Again, exact details of the architecture or manufacturer of the computer system should not be considered as limiting, since the present invention can be implemented on any multidimensional multi-processor system, meaning that the processor cores are arranged in an interconnected multidimensional configuration, including configurations interconnected as a torus, as long as multidimensional system uses an internodal interface device that can operate autonomously of its associated processor.

The DMA (Direct Memory Access) unit on the BG/P and the MU (Messaging Unit) device on the BG/Q offload communications from the processor cores as a mechanism to intercommunicate between the cores. These devices support three modes of communication: 1) memory FIFO (First In First Out), 2) direct put, and 3) remote get.

Memory FIFO messages, such as Remote Direct Memory Access (RDMA), move data packets to a remote memory buffer, and the direct put instruction moves data payload directly to a remote memory buffer. A remote get can move remote data payload to a local buffer. In a remote get operation, the payload of the remote get contains a direct put descriptor which can initiate a put back to the node that initiates the remote get or to any other node.

In addition, the torus network instruction set allows packets to be deposited along a line of the torus. Broadcast on a 3D rectangle partition can be done by, for example, a deposit bit send along the X-direction, followed by a deposit bit send along the Y direction and finally a deposit bit send along the Z direction. In the conventional broadcast mechanisms, each of the intermediate steps requires processor interaction to trace incoming data and then initiate the next dimension, which processing the present inventors have recognized as adversely affecting the latency of the broadcast operation.

These operations are representative of a larger number of instructions described in the Message Passing Interface (MPI), a standardized, portable message-passing system designed by a group of researchers for parallel computers in the early 1990s. This standard defines the syntax and semantics of a core of library routines useful to a wide range of users writing portable message-passing programs in different computer programming languages such as Fortran, C, C++ and Java. Although MPI is not sanctioned by any major standards group, it has become a de facto standard that has fostered the development of a more standardized parallel software industry, by encouraging the development of portable and scalable large-scale parallel applications. MPI is a language-independent communications protocol used for programming parallel computers and supports both point-to-point and collective communication.

Overall, MPI provides a rich range of abilities, including communicator objects that selectively connect groups of processes in the MPI session. A number of other important MPI functions, referred to as point-to-point operations, involve communication between two specific processes. Collective functions involve communication among all processes in a process group, which can mean the entire process pool or a program-defined subset. For example, a broadcast function can take data from one node and send it to all processes in the process group. A reverse operation can take data from all processes in a group, pedal n an operation (such as summing), and store the results on one node. Such collective functions can be useful at the start or end of a large distributed calculation, where each processor operates on a part of the data and then combines it into a result.

Asynchronous one-sided collectives that do not involve participation of the intermediate and destination processors are critical for achieving good performance in programming paradigms such as Charm++, UPC, etc. For example, in an asynchronous one-sided broadcast the root initiates the broadcast, and all destination processors receive the broadcast message without any intermediate nodes forwarding the broadcast message to other nodes. Thus, in the abovementioned 3D rectangle broadcast there are three phases of processor involvement as each deposit bit line broadcast can only propagate data on one dimension at a time.

The present inventors have recognized that efficiency can be improved for broadcast instruction propagation in a multiprocessor having a plurality of nodes interconnected in a multidimensional (e.g., N dimensions, where N>1) configuration, each node having a processor and at least one associated inter-nodal interface device used to offload data from that node to other nodes in the system, if the processors at the intermediate nodes can be relieved of participation in implementing such broadcast instruction propagation.

SUMMARY

The present invention addresses this newly-recognized problem in that it provides a method to improve transmission efficiency in a multidimensional multiprocessor system by, in one exemplary embodiment, providing a broadcast procedure from an initiating node to incorporate wild card characters in a packet that define to intermediate nodes receiving the packet a procedure to be implemented autonomously by the messaging unit at the receiving intermediate node to forward, without using processor resources at the receiving intermediate node, the broadcast request in a different direction from that upon which it was received.

Further, the messaging unit devices of processor nodes are modified so that intermediate nodes receiving such packets having at least one wild card to autonomously (without direction from the processor at that intermediate node) modify such received packet and provide an additional propagation path of the modified packet in a dimension different from the dimension of the received packet, by swapping its node's coordinates into wild card positions to generate a transmission instruction as the originating node in the different dimension.

In an exemplary embodiment, a first type of wild card is related to specifying which dimension(s) of a multidimensional multiprocessor grid are involved, and a second type of wild card is related to specifying at least one of a start point and an end point for the propagation of the broadcast request in each of the various dimensions of the multidimensional multiprocessor grid. Such wildcard capability permits broadcast propagation capability for either the entire grid or for any specified subset of multiprocessors on the grid.

Such autonomous (meaning, that the processor at a receiving node is not involved) additional propagation paths that added at intermediate nodes permits broadcast instructions to be implemented quickly, without utilizing computation resources of processors at the intermediate nodes, whether the broadcast is throughout the entire multiprocessor configuration or to any subset of nodes thereof, and as defined by information provided in the packet transmitted by the originator node, as based on the wild cards present in the broadcast request from the originator node.

The present invention accordingly provides an improved broadcast procedure that reduces lag time for broadcasts in multidimensional multiprocessor systems by eliminating both the pre-set tree structures and the necessity for processors at intermediate nodes to be involved in implementing broadcast instructions.

DETAILED DESCRIPTION

Figure 1:
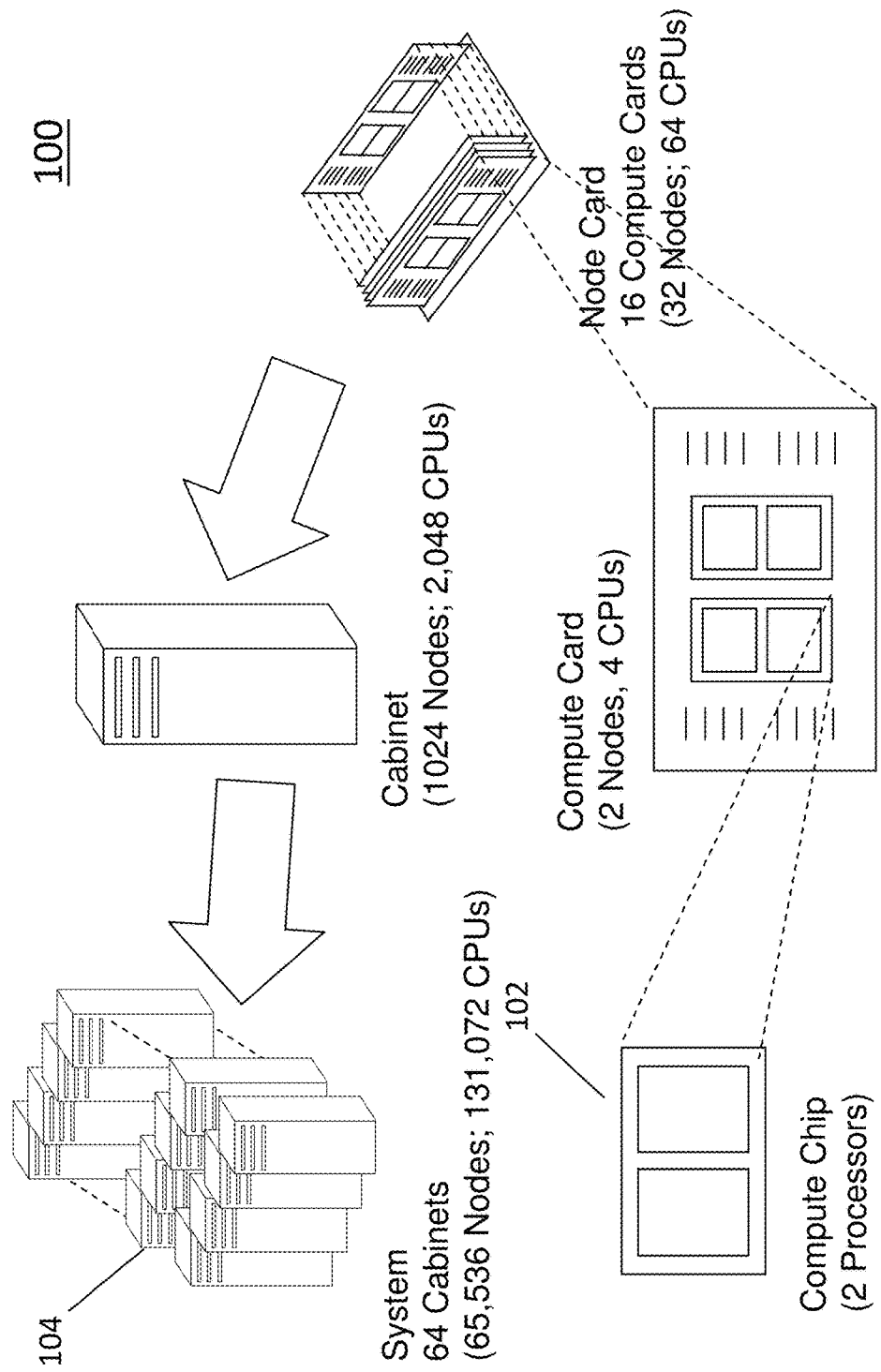
FIG. 1 shows a hierarchical buildup architecture 100 of processing units in an exemplary Blue Gene computer system configuration.

In summary and as used to exemplarily describe the relevant concepts, the present invention extends the capability for BG/Q torus packets to permit wild cards for destination coordinates in such broadcast instructions as the RDMA instruction, as intended to enable a memory device at an intermediate node to autonomously add an asynchronous one-sided broadcast in an axis associated with a wild card in a broadcast instruction packet and that is different from the axis upon which the packet was received by the intermediate node from a previous node in the propagation path, whether the previous node is an originator node or another intermediate node that is forwarding the packet. In adding a direction of the broadcast request into a new dimension, each intermediate node that makes such change in propagation direction modifies the broadcast request as received by serving the role of an originator node for the broadcast in the new dimension by swapping in its own coordinates in wild card positions of the instruction packet.

Such creating of new originator nodes for each new propagation dimensions permits any data, such as arising from remote get instructions, or other feedback information, if any, that might be returned because of the broadcast request, to be returned to the originators in each such dimension, which will then, in turn, relay such data to its own originator node, ultimately bringing such data back to the originator node that initially sent out the broadcast request. The RDMA instruction is used for explanation of the concepts of the present invention but a similar approach can be implemented in other instructions, such as direct put and remote get DMA operations.

Although the present invention is explained using the BG torus configuration (exemplarily a simplistic 3×3×3 torus) and an RDMA instruction from the MPI standard, that is sequentially chained at intermediate nodes into new one-dimensional broadcasts, there is no intent to be limited thereby. The present invention can be implemented on any multiprocessor configuration having a plurality of nodes interconnected in a configuration of at least two dimensions, where each node incorporates both a processor core with an associated memory and an inter-nodal interface device that provides inter-nodal communications with other nodes without significant control by its associated core processor. Specific examples of such inter-nodal interface devices are the DMA (Direct Memory Access) unit on the BG/P and the MU (Messaging Unit) device on the BG/Q, but these are intended as non-limiting examples. In the following explanation, the terminology "Messaging Unit" or "MU" will be used as intending to signify a generic inter-nodal interface device associated with each multiprocessor node and used for inter-nodal communications.

In the described exemplary embodiment used for explaining the concepts, the present invention can also be considered as combining asynchronous collectives, also referred to herein as "async collectives", and RDMA (Remote DMA) operations, along with wild card capability in packets including broadcast instructions and in MUs of intermediate nodes that receive such packets. In general and as applied in the present invention, the async collectives optimize application performance. The initiator core will start a collective while receivers receive payloads asynchronously, whereas the RDMA is used to optimize throughput at least in part because memory-to-remote memory transfers are zero-copy.

In an exemplary embodiment, for an N-dimensional torus, the initiator in the present invention initiates N chained RDMA transactions, using an initial packet with wild card bits. The first RDMA also has a broadcast payload. The RDMA packets follow each other and are deposited on the nodes on the first dimension. At the first intermediate nodes, the nodes stamp their coordinate and then forward the RDMA chains downstream. This step is repeated until all the downstream dimensions are completed. The present invention thereby achieves a source-routed collective with current generation RDMA hardware; source-routing of point-to-point packets is already known in the art.

The present invention thus provides a broadcast method in a torus network such that no trees are required to be set up, as is required for conventional asynchronous collectives in which pre-set trees are set up to implement async collectives. To implement the present invention, the conventional MUs are modified in order to implement the autonomous additional transmission paths described herein, as controlled by wildcard indicators in the packet transmitting the broadcast instructions.

Figure 2:
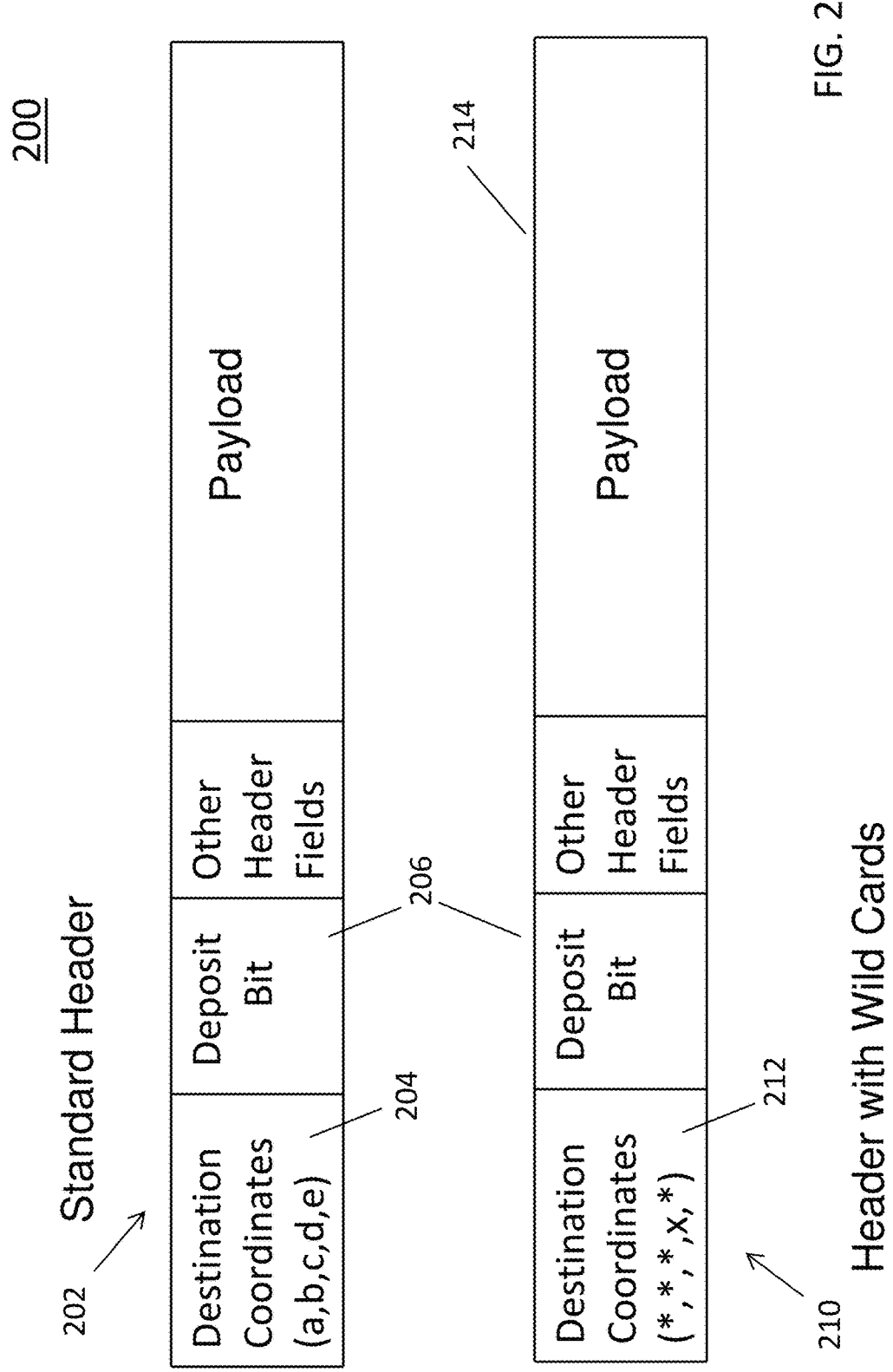
FIG. 2 shows exemplarily a comparison 200 between a standard packet 202 and a packet 210 of the present invention, having wild card capability in the header.

To illustrate an exemplary embodiment of the present invention, FIG. 2 shows a comparison 200 between a standard packet format 202, as might be used on the 5-Dimensional (5D) BG/Q for a conventional RDMA request packet, along with a modified packet format 210 that demonstrates the technique of inserting wild card characters 212 into the packet header as part of a broadcast procedure. The destination coordinates 204 of the standard header 202 define the endpoint coordinates for the packet, and deposit bit 206 instructs a receiving intermediate node to retain data of the received packet in a preset memory device in the receiving node.

The deposit bit 206 and the wildcards 212 of the header of the modified packet 210 identify to MUs of intermediate nodes receiving this new type of packet format to initiate a broadcast in a new dimension of the grid, as will be explained in the discussion for FIG. 3. Broadcast payload 214 is used in an exemplary embodiment to provide a specific sequence of different directions that the intermediate nodes should implement their broadcast using a mechanism which the grid coordinates of the intermediate node are swapped into wild card positions to generate a new broadcast instruction in the new, addition propagation direction.

Different characters are known in the art as signifying a wild card character, such as the asterisk "*" symbol used in FIG. 2, or the question mark "?" symbol used later in this discussion, but it should be clear that the present invention is not intended as limited to any specific symbol that would signify a wild card character. Packet format 210 of FIG. 2 is exemplarily indicating "*" in four of the five dimensions. The character "x" in the destination coordinates field 212 of the modified packet 210 is also a type of wild card (e.g., variable) which serves to define a propagation length for that dimension. In the exemplary embodiment used for explaining the invention, this variable "x" in FIG. 2 will have a specific value that defines an endpoint for propagation transmissions along one or more axes in the grid.

Figure 3:
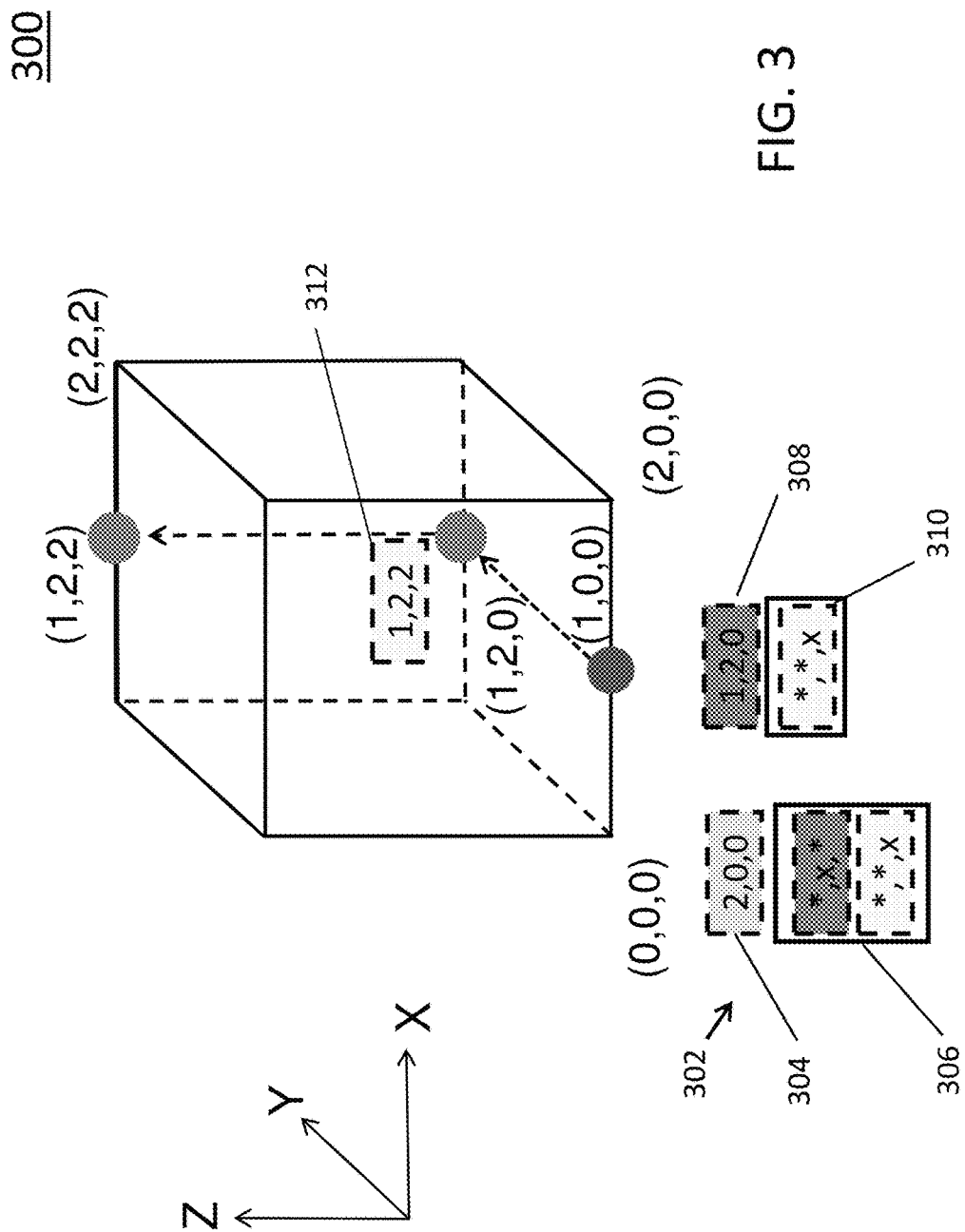
FIG. 3 shows exemplarily a simplistic 3×3×3 mesh of processor nodes 300 to explain the method of the present invention, showing actions at intermediate nodes (1,0,0) and (1,2,0) and final node (1,2,2) during an example broadcast process.
Figure 4:
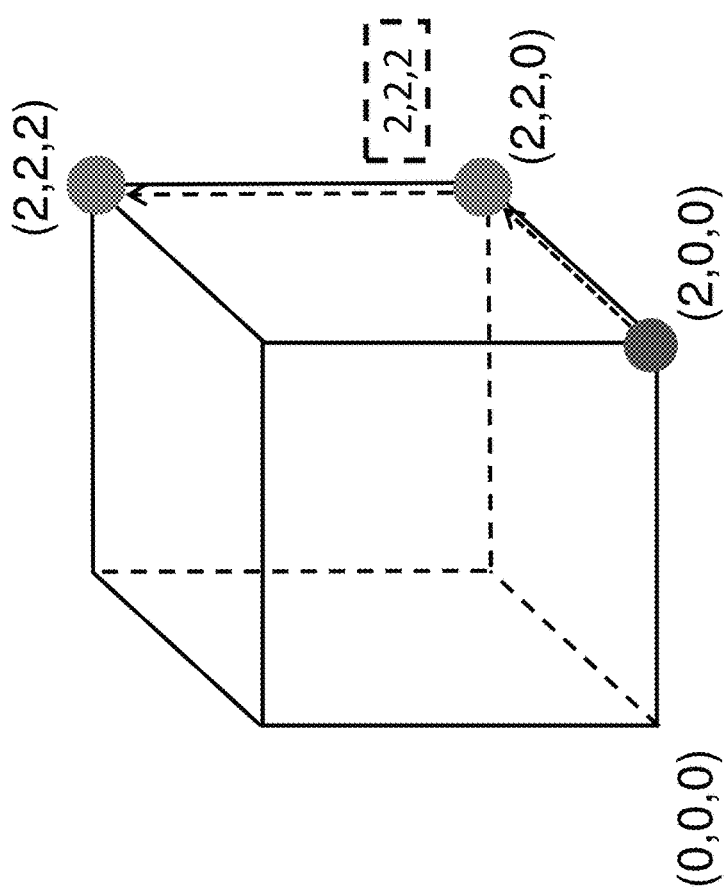
FIG. 4 shows actions 400 of intermediate nodes (2,0,0) and (2,2,0) and final node (2,2,2) in the example broadcast process.
Figure 5:
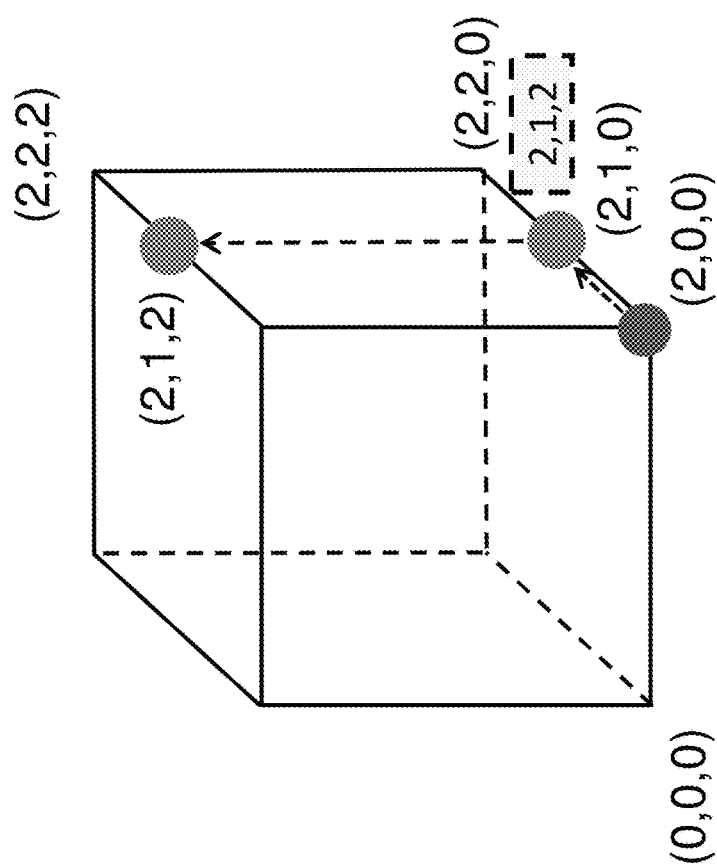
FIG. 5 shows actions 500 of intermediate nodes (2,0,0) and (2,1,0) and final node (2,1,2) in the example broadcast process.

FIGS. 3, 4, and 5 demonstrate various portions of a broadcast propagation from the originator node (0,0,0) in a simple 3×3×3 grid further assumed to be interconnected as a 3D torus, using the wildcard-based mechanism of the present invention. Each node position in these figures represents a computer node, each computer node having a processor and an associated memory and an associated messaging unit (MU) that serves to provide inter-nodal communications with other nodes.

As shown in this simple example, the packet 302 from originator node (0,0,0) would have included a transmission instruction [2,0,0] to initially be along the X-axis to endpoint node (2,0,0), the most distant point in this X-axis in the torus from the originator node (0,0,0), along with broadcast payload 306 having two fields with wild card characters. Thus, in this simple example, wildcard/variable "x" would be assigned a value of "2" and would be identical for all three axes.

The MU of the first node (1,0,0) in FIG. 3 receiving this packet recognizes from the deposit bit and wild card characters in the packet header (not shown in FIG. 3) that it is an intermediate node and that the MU is to not only forward the received packet on to the next adjacent node (2,0,0) along the transmission axis (since the defined endpoint "x"=2 along the transmission axis has not been reached), but that it must also autonomously (without further instruction from its associated processor at that node) implement an additional broadcast propagation path, in this case, a new broadcast in the Y axis at X=1.

To achieve this new broadcast propagation path, the MU of the receiving intermediate node has been configured to examine the received packet broadcast payload 306 and to recognize from the first descriptor field [*,x,*] that it is to provide a modified transmission in accordance with the wild card characters in this first descriptor. In the case of node (1,0,0), the MU at that node would swap its node coordinates into the wild card positions of the descriptor field [*,x,*] to provide a new transmission instruction [1,x,0] 308, where this node (1,0,0) as the transmission path length in the added propagation path to be in the Y axis. The value of x is a number chosen at the root node. In this example as the dimensions of the torus are 2 in each dimension the root would have specified x=2. If the packet is broadcast to a different sized torus or a subset of the torus the root must choose a different value of x. The same is repeated at node [2,0,0] although not specified in the figure to propagate the packets to the YZ plane at node (2,0,0). The modified packet will be transmitted along the Y axis at X=1 to the endpoint x=2, and will include the remaining descriptor field [*,*,x] 310 as a broadcast payload. Node (1,0,0) becomes the initiator node by intermediate nodes (1,1,0) and (1,2,0) in this new transmission direction along the Y axis at X=1.

Upon receiving the packet along the Y axis from node (1,0,0), the MU at intermediate node (1,2,0) will then take this remaining descriptor field [*,*,x] to itself similarly initiate a transmission instruction in the Z axis by inserting its own coordinates into the wildcard positions, to thereby provide new transmission instruction [1,2,2] 312, to forward the broadcast propagation along the Z axis to node (1,2,2). As stated above the root must choose x=2 as we have a 2×2×2 torus. Again, node (1,2,0) is recognized as the originator node in this transmission along the Z axis at location (X=1, Y=2). The swapping of the wild card characters (*) is critical as the front packet header must have valid coordinates to route to the destination. The RDMA packets in the payload can have wild card characters that will be swapped at the intermediate nodes as described above.

Although the broadcast length (end point) x=2 in this specific example, it should be clear that, in general, these three transmission lengths need not be identical for all three axes. It should also be clear that broadcast length x=2 serves the purpose of preventing a wraparound of the propagation in a torus configuration.

FIG. 4 shows the actions of intermediate nodes (2,0,0) and (2,2,0) to propagate the packet from originator node (0,0,0) to node (2,2,2). Again, receiving intermediate node (2,0,0) becomes the initiator node in the Y direction at X=2, and receiving intermediate node (2,2,0) becomes the initiator node in the Z direction at Y=2, to get the packet to destination node (2,2,2). FIG. 5 shows actions of intermediate nodes (2,0,0) and (2,1,0) to destination node (2,1,2). It should be clear from the examples of FIGS. 3-5 that other intermediate nodes of the cube 300 could similarly add transmission propagation paths based on swapping node coordinates into wild card positions to generate transmission instructions that each identify a new axis upon which to add a propagation path.

It should also be clear that the request from originator node (0,0,0) could also have defined both a starting point and an ending point in the transmission path along the X axis, the starting point signifying the point along the X axis at which the intermediate nodes would begin the reformatting and transmission along the Y axis and the ending point signifying the final node to make such reformatting and retransmitting along the Y axis. Similarly, the broadcast payload components 310 could likewise include information for starting and ending points in the Y and Z axes, thereby permitting the originator node (0,0,0) to define a specific subset of nodes to receive the broadcast transmission.

It should also be clear that the above-described example would not be limited to three dimensions, since it could be implemented in any multidimensional grid of processor nodes with N dimensions, N>1.

The broadcast mechanism demonstrated exemplarily in FIGS. 3-5, can be described in different wording, as follows. Originator node (0,0,0) in an NX*NY*NZ (e.g., 3×3×3) torus does a direct put of a deposit bit packet to node (NX-1,0,0) (e.g., node (2,0,0)) and follows that up with a remote get descriptor the payload of which carries a put to node (?,NY-1,0) (e.g., node ?,2,0). At each receiving node (x,0,0) on the X axis, the remote get descriptor is altered by the MU of the receiving node to be a put to the node (x, NY-1, 0) (e.g., node (x, 2, 0).

Originator node (0,0,0) can also then inject a remote get descriptor via the above mechanism whose payload is a remote get descriptor to do a put to destination (x, ?, NZ-1) (e.g., nodes (x, ?, 2) on the node (x, y, 0). The put descriptor will have to reside in the memory of the intermediate node (x,y,0). The MU on node (x,y,0) while processing the put descriptor will change it to do a put to (x,y, NZ-1). So, after injection of three descriptors from root (0,0,0):

1. Put to deposit broadcast payload along X dimension;
2. Remote get whose payload is a put descriptor to destination (?, $N_{Y-1}$, 0) to deposit the broadcast on the XY plane; and
3. Remote get whose payload is a remote get descriptor to destination (?. NY-1,0). The payload of the second remote get descriptor is a put to destination (x, ?, NZ-1) to deposit the root's data on all the processors in the z dimension.

Observe there is no participation of processors on intermediate nodes while the data is propagated to all nodes in the 3D torus. In the exemplary embodiment of FIG. 3, the remote get descriptors were injected by originator node (0,0,0) using the broadcast payload 310. In the example of FIG. 3, the mechanism could also be considered as a "chaining" by the originator node of a broadcast instruction, for example, the RDMA instruction, into the different new dimensions.

The above method can be easily extended to an N-dimensional torus with the injection of N-descriptors at the root node and some temporary memory to store intermediate remote gets and puts the correct wild cards. In addition to providing an asynchronous broadcast collective, the above technique can significantly improve the latency of torus network broadcast as it avoids processor involvement on the intermediate nodes.

Figure 6:
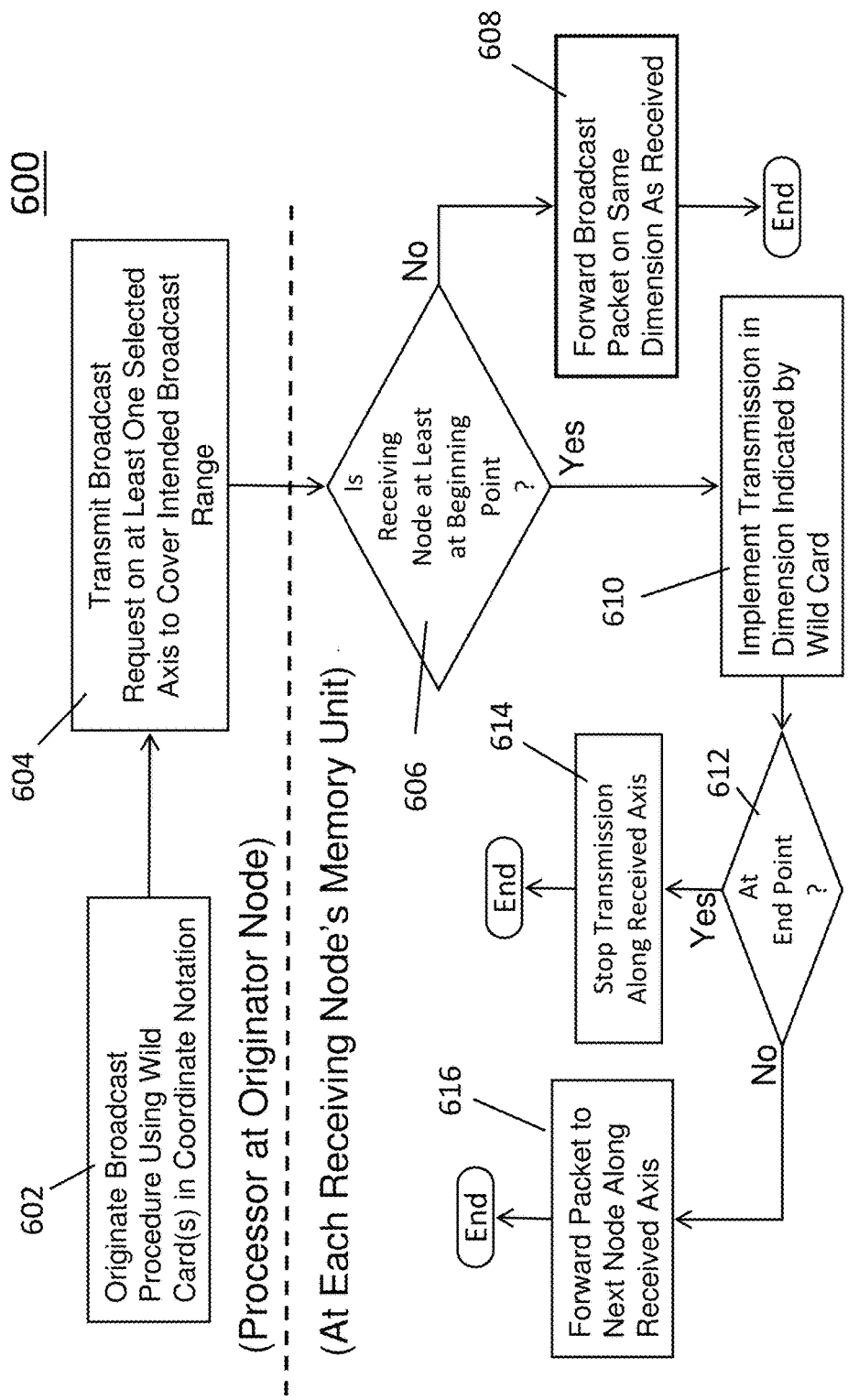
FIG. 6 shows in flowchart format 600 a method of an exemplary embodiment of the present invention.

FIG. 6 provides an exemplary flowchart 600 of a generic method to implement the present invention as embodied in FIG. 3. In step 602, the processor in the originating node generates a broadcast request having wild card(s) in coordinate notation that covers the intended broadcast range in the multidimensional multiprocessor configuration, including possibly descriptors that limit ranges of transmitting the broadcast request packets in the various dimensions. In step 604 the originator node transmits the request packet on a selected axis that will cover the intended broadcast destinations.

The remaining steps 606-616 are implemented in the memory devices of nodes that receive the transmission packet from the originator node, as follows.

In step 606 the receiving node MU determines if it is located at least at the beginning point identified in the request. If not, in step 608, the MU simply forwards the transmission along the receiving axis to the next adjacent node. If the receiving node is at least at the beginning point, in step 610, the receiving node will implement an additional transmission path in at least one different direction by swapping its node coordinates into wild card positions, as indicated by the wild card notation of the received packet. In step 612, the receiving node determines whether it is located at the end point along the received transmission axis and, if so, in step 614, terminates further transmission along the transmission axis. If the receiving node determines that it is not located at the end point of the transmission axis, in step 616 the receiving node forwards the received packet to the next node along the transmission axis in the dimension it was received.

Turning now to hardware aspects to implement the present invention on, for example, the BG torus configurations, these concepts can be implemented by modifying the existing instruction set of the processors of each node to be able to originate a broadcast transmission request that includes wildcards. The MU module at each node would be modified to receive broadcast instructions with wildcards, check to determine if the receiving node is within any range limitations defined in the request and, if so, implement a modification on the received data packets to add propagation paths for broadcast instruction packets in any new direction defined by wild cards located in a coordinate notation in the request, by swapping its node coordinates into the wild card character positions. It is noted that the existing instructions and formats of the current MPI specification would not have to be changed to implement the present invention.

Having explained briefly in FIGS. 3-6 how various intermediate nodes could permit their respective MUs to asynchronously reformat a received broadcast packet from an adjacent node by effectively "chaining" the broadcast request into different dimensions at the intermediate nodes, it should be clear that a non-limiting number of variations are possible, as demonstrated by the following examples.

First, although the explanation assumed that node (0,0,0) initiates a packet broadcast, it should be clear that any node could have been the initiator node. Stated differently, any node that assumes the initiator node role could be arbitrarily designed as coordinates (0,0,0) relative to the instant broadcast request, and the coordinates of the transmission could be expressed relative to assuming the originator node is arbitrarily node (0,0,0). Thus, the coordinate system designation used could be either absolute (i.e., relative to the entire grid) or could be relative (i.e., relative to the originator node, arbitrarily assumed to be node (0,0,0) for the broadcast request).

Second, although a 3D torus was used in the example explanation, it should be clear that any number of dimensions could be used, as long as there are at least two dimensions in the multidimensional multiprocessor configuration. It should also be clear that the multidimensional configuration need not be configured as a torus in which dimensions "wrap around." Any multidimensional configuration could benefit by the present invention. Descriptor fields could be used to identify discrete starting and ending coordinates, if desired, to define specific subsets of nodes in a multidimensional grid that receive the broadcast instruction packets.

Third, although the 3D example had all three axes with the same length, it should be clear that there is no need for all dimensions of a multidimensional grid to have the same length. Thus, the wild card values used to control start and/or stop points (propagation lengths) in one dimension may differ from that used in another dimension. In a torus configuration, the broadcast length would typically be the node most distant from the originator node in each dimension if the entire grid is to be covered by the broadcast, since the propagation length limit would prevent propagation from wrapping around the originator node of that dimension.

Fourth, although the example described that the MU in each intermediate node was configured to reformat the broadcast in only one dimension, it would be possible to have the MUs reformat in more than one dimension, with the benefit that even less time would be expended to cover that entire grid if each intermediate node serves as the originator node in more than one dimensional. One difficulty of using concurrent one-dimensional transmissions is that it might be more difficult to visualize and ensure intended coverage of the transmission without undue overlap of the transmission path, and the coordinates would have to be described in an absolute coordinate system rather than coordinates relative to the originator node.

Fifth, although the example described a broadcast that was intended to cover the entire multidimensional grid, it should be clear that some broadcasts might be intended for only a specific subset of a multidimensional grid. Accordingly, another variation would include wild card descriptor fields that designate both a starting point and an ending point for each axis for propagating requests from an originator node.

Sixth, the example described herein is not intended as implying any limitations on exact details of formats or presence/absence of wild card character designators in the packets being propagated. Rather, the present invention is intended to provide a generic mechanism by which propagation requests from an originator node can be efficiently disseminated from that originator node throughout an intended range in a multidimensional grid without involving processor resources at intermediate nodes that receive the request packets.

Indeed, in some applications, the wildcard capability could be implemented without having actual generic wildcard characters in any of the packets, as long as the format provides some mechanism by which each intermediate node that receives a broadcast request can recognize whether it should forward the received packet on to the next node along the intended transmission path in the dimension that it was received and whether that receiving node should become an originator node for adding a new propagation path and begin propagating the broadcast request in that new direction. The new direction could be decided by the MU, for example, by simply initiating a transmission in a new dimension that is subsequent in position of a standard coordinate designation for the system.

Thus, for example, at least some of the wild cards designations could be eliminated in the packet format 210 described in FIG. 2 and FIG. 3 by recognizing that the grid 300 could be considered as an XYZ coordinate system. Elimination of wild cards in the packet 210 could be achieved by considering that every originator node (0,0,0) could be programmed to send its initial broadcast requests in the X axis. Every intermediate node along this transmission path (e.g., nodes (1,0,0) and (2,0,0)) would understand to autonomously reformat the received transmission in the next adjacent dimension, which is the Y direction. Finally, every receiving immediate node in the Y-direction transmission would understand to autonomously reformat the received transmission in the next adjacent dimension, which is the Z direction. By this preset sequencing of adding propagation paths the wild card characters could be eliminated from the broadcast instruction packet shown exemplarily in FIG. 2, although the packet would still incorporate descriptive that define starting and/or stopping points of the added propagation path.

The descriptions of the various embodiments of the present invention have been presented for purposes of illustration, but are not intended to be exhaustive or limited to the embodiments disclosed. Modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method, comprising:
   in a multiprocessor system comprising a plurality of processor nodes interconnected in a multidimensional array, each said processor node comprising a processor, an associated memory device, and an associated inter-nodal interface device that selectively permits exchange of data for said node with other nodes in a manner autonomous of a control of the processor at that node, providing instructions to each processor for implementing a broadcast procedure that can be selectively initiated by the processor as an initiator node of said plurality of processor nodes and as intended to be received by a plurality of processor nodes different from said initiator node, using a format that permits inter-nodal interface devices at each node receiving a broadcast instruction packet from the initiator node to be able to process the received broadcast instruction packet in accordance with the broadcast procedure without using processing resources of the processor at the receiving node; and in each node of said multidimensional array, providing an inter-nodal interface device with operational instructions permitting the inter-nodal interface device to:

receive an input packet from an adjacent node;

determine whether the received input packet comprises a broadcast instruction packet for which the receiving node is to participate; and execute instructions, when the received input packet is determined to require participation by the receiving node, to implement its participation in the broadcast procedure without using processing resources of a processor associated with the receiving node.

2. The method of claim 1, wherein the broadcast procedure comprises selectively adding propagation paths at nodes receiving the broadcast instruction packet in a dimension different from a dimension the input packet was received by the node.

3. The method of claim 2, wherein the broadcast procedure further comprises that the receiving node that adds a new propagation path becomes an initiator node for the added propagation path, such that data resultant from the broadcast instruction is reported back to the initiator node.

4. The method of claim 2, wherein the broadcast procedure comprises that an inter-nodal interface device at the node receiving the broadcast instruction packet uses its node coordinates to generate a transmission instruction that is transmitted to add a new propagation path for the received broadcast instruction packet.

5. The method of claim 4, wherein:

the received broadcast instruction packet comprises a header portion including at least one field with at least one wild card character and a broadcast payload portion comprising at least one field with at least one wild card character; and the inter-nodal interface device at the node receiving the broadcast instruction packet generates the new transmission instruction by swapping its corresponding node coordinates into wild card positions of one of the at least one field of the broadcast payload portion of the received broadcast instruction packet.

6. The method of claim 3, wherein the broadcast procedure further comprises that the inter-nodal interface device further inserts into the generated transmission instruction at least one of a transmission starting node and a transmission ending node for the new propagation path.

7. The method of claim 2, wherein:

the broadcast procedure comprises a chaining of a remote direct memory access (RDMA) instruction into the added propagation paths; and a node that adds a new propagation path becomes an initiator node for that added propagation path such that data resultant from the RDMA instruction is reported back to the initiator node.

8. The method of claim 2, wherein the multiprocessor system comprises a multidimensional torus and wherein the broadcast procedure further comprises adding a transmission length for each added propagation path.

9. The method of claim 1, as implemented in at least one set of instructions tangibly embodied in a non-transitory storage medium.

10. The method of claim 8, wherein said non-transitory storage medium comprising a storage medium on at least one of:

a node processor in said multiprocessor system; and a controller for an inter-nodal interface device of said multiprocessor system.

11. An apparatus, comprising a plurality of processor nodes interconnected in a multidimensional array, wherein each said processor node comprises:

a processor;

a memory unit associated with said processor; and an inter-nodal interface device capable of selectively controlling an exchange of data for said node with other nodes in a manner autonomous of a control of the processor at that node, wherein said processor is configured to selectively serve as an initiator node for initiating a broadcast instruction for implementing a broadcast procedure and as intended to be received by a plurality of processor nodes different from said initiator node, using a format that permits inter-nodal interface devices at each node receiving a broadcast instruction packet from the initiator node to be able to process the received broadcast instruction packet in accordance with the broadcast procedure without using processing resources of the processor at the receiving node; and wherein said inter-nodal interface device is to:

receive an input packet from an adjacent node;

determine whether the received input packet comprises a broadcast instruction packet for which the receiving node is to participate; and execute instructions, when the received input packet is determined to require participation by the receiving node, to implement its participation in the broadcast procedure without using processing resources of a processor associated with the receiving node.

12. The apparatus of claim 11, wherein the broadcast procedure comprises adding propagation paths at nodes receiving the broadcast instruction packet in a dimension different from a dimension the input packet was received by the node.

13. The apparatus of claim 12, wherein the broadcast procedure further comprises that the receiving node that adds a new propagation path becomes an initiator node for the added propagation path, such that data resultant from the broadcast instruction is reported back to the initiator node.

14. The apparatus of claim 12, wherein the broadcast procedure comprises that an inter-nodal interface device at the node receiving the broadcast instruction packet use its node coordinates to generate a transmission instruction that is transmitted to add a new propagation path for the received broadcast instruction packet.

15. The apparatus of claim 14, wherein:

the received broadcast instruction packet comprises a header portion including at least one field with at least one wild card character and a broadcast payload portion comprising at least one field with at least one wild card character; and the inter-nodal interface device at the node receiving the broadcast instruction packet selectively generates the new transmission instruction by swapping its corresponding node coordinates into wild card positions of one of the at least one field of the broadcast payload portion of the received broadcast instruction packet.

16. The apparatus of claim 13, wherein the broadcast procedure further comprises that the inter-nodal interface device further inserts into the generated transmission instruction at least one of a transmission starting node and a transmission ending node for the new propagation path.

17. The apparatus of claim 12, wherein:
the broadcast procedure comprises a chaining of a remote direct memory access (RDMA) instruction into the added propagation paths; and
a node that adds a new propagation path becomes an initiator node for that added propagation path such that data resultant from the RDMA instruction is reported back to the initiator node.

18. The apparatus of claim 12, wherein the multiprocessor system comprises a multidimensional torus and wherein the broadcast procedure further comprises adding a transmission length for each added propagation path.

19. A controller for an inter-nodal interface device for a node in a multiprocessor system comprising a plurality of nodes interconnected in a multidimensional array, each said node comprising a processor, an associated memory device, and an associated inter-nodal interface device that selectively permits exchange of data for said node with other nodes in a manner autonomous of a control of the processor at that node, the controller comprising a memory having stored therein instructions permitting said inter-nodal interface device to:

receive an input packet from an adjacent node;
determine whether the received input packet comprises a broadcast instruction packet for which the receiving node is to participate; and
execute instructions, when the received input packet is determined to require participation by the receiving node, to implement its participation in a broadcast procedure without using processing resources of a processor associated with the receiving node.

20. The controller of claim 19, wherein:
the broadcast procedure comprises adding propagation paths at nodes receiving the broadcast instruction packet in a dimension different from a dimension the input packet was received by the node;
the received broadcast instruction packet comprises a header portion including at least one field with at least one wild card character and a broadcast payload portion comprising at least one field with at least one wild card character; and
the inter-nodal interface device at the node receiving the broadcast instruction packet generates the new transmission instruction by swapping its corresponding node coordinates into wild card positions of one of the at least one field of the broadcast payload portion of the received broadcast instruction packet.

* * * * *